Nov. 3, 1925.                                                       1,559,712
R. H. LAKE
POWER TRANSMISSION FOR AUTOMOBILE OPERATED TOOLS
Filed Jan. 21, 1924
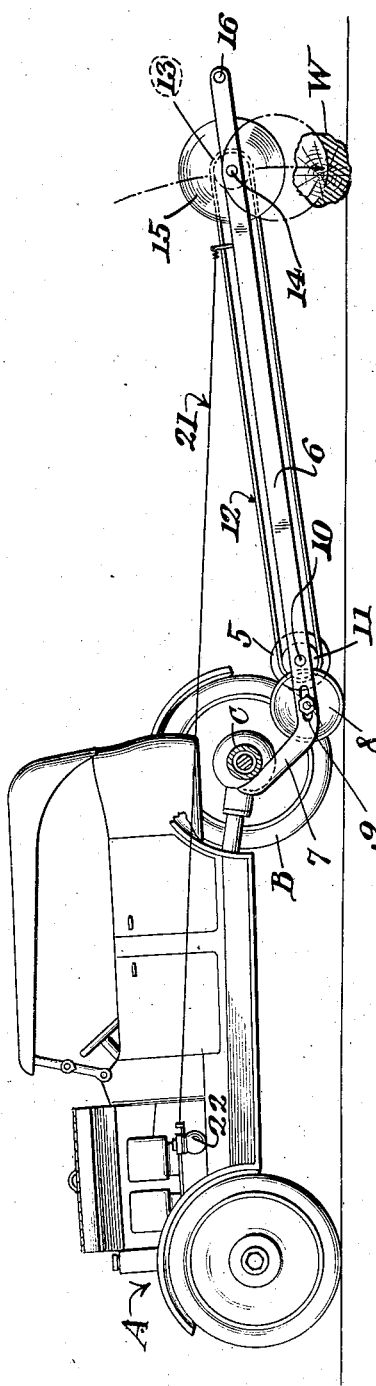
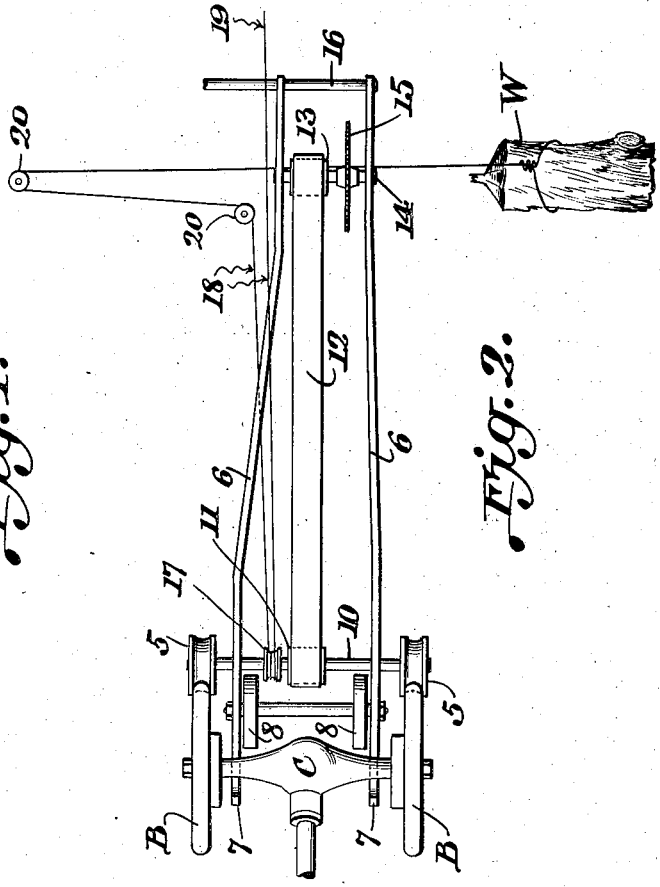
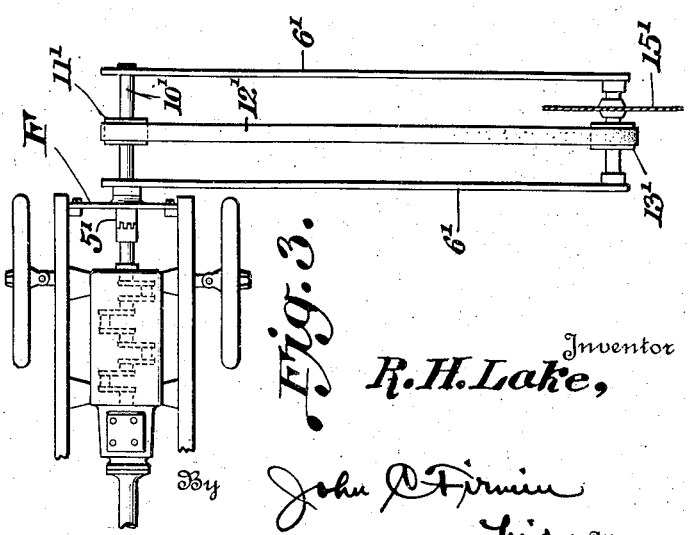
Inventor
R. H. Lake,
By John C. Firmin
his Attorney Patented Nov. 3, 1925.

1,559,712

UNITED STATES PATENT OFFICE.

ROBERT HOWARD LAKE, OF TAKOMA PARK, MARYLAND.

POWER-TRANSMISSION FOR AUTOMOBILE-OPERATED TOOLS.

Application filed January 21, 1924. Serial No. 687,595.

*To all whom it may concern:*

Be it known that ROBERT HOWARD LAKE, a citizen of the United States, residing at Takoma Park, in the county of Montgomery and State of Maryland, has invented certain new and useful Improvements in Power-Transmission for Automobile-Operated Tools, of which the following is a specification.

This invention relates to improvements in a power transmission for automobiles whereby the power of the automobile may be economically used and readily applied to operate a tool such as a saw, auger, or other boring or cutting device in which it is necessary to move the tool to and away from the work.

A further object of this invention is to provide a device of this character which is portable and may be transported on its own wheels, if necessary, to the place where the work is being done, and may be then applied with ease in such position to the automobile, that both wheels of the same will operate to do the work, thus putting the least possible strain upon the differential.

A further object is to provide a machine of this character including a frame for the tool which may be attached by a suitable connection directly to the front of the engine of an automobile, or similar rotating part of any other power plant, as a stationary engine.

A further object of this device is to provide means whereby work may be drawn to such a position, relative to the tool, that it may be easily operated on.

A still further object is to provide a power transmission carried by a frame, oscillating about the point of connection between the source of energy and the drive shaft of the transmission assembly in such a way that it will act upon a throttle control, for instance, so that as the frame and saw approach the work the power will be increased, as by opening the throttle of the engine, and the saw when moving away from the work will allow the throttle to close and decrease the power.

With these and other objects in view, the invention consists in certain novel features of construction, illustrated in the accompanying drawings, in which, Figure 1 is a side elevation of my device applied to the rear wheels of an automobile;

Figure 2 is a plan of the arrangement shown in Figure 1; and,

Figure 3 is a plan of a modified form.

In the drawings an automobile A is shown with its wheels B raised off the ground and supported by contact of said wheel with a drive pulley 5 on a frame 6 and held in such relation therewith by the arm 7 against which rests the axle C, the whole being supported by the wheels 8 mounted for adjustment in a slot 9 at one end of said frame.

A power shaft 10 carries intermediate the frame members a pulley 11, having a belt 12 which runs over a pulley 13 on a shaft 14 carrying a saw 15, thereby transmitting the power from the wheels of the automobile to the saw. Other sawing or boring tools may be mounted at the end of this frame, and operated in a similar manner. A handle 16 is provided for the operator to grasp and raise or lower the tool.

This arrangement allows the device to be used with machines of different type and weight. In order to balance the weight of the machine for easy oscillation about the wheel 8 and the contact wheel 5 the wheel 8 may be moved either forwardly or backwardly along the slot thus changing the relative length of the lever arm on each side of the pivot.

This machine is particularly desirable in heavy timber and old slashings where there is a great deal of heavy down wood. In order to facilitate the handling of large pieces and to also provide a feed for use when sawing, I have attached to said shaft 10 a nigger-head 17. A cable 18 may be held in the hand at 19, and when passed about the member 17 and around suitably placed pulleys 20, may be attached to the log or other work W. A pull on the cable causes frictional engagement of same with the nigger-head whereupon the cable is wound up, and the work drawn into position beneath the tool.

A cable 21 attached to the frame adjacent the operator's handle 16 may be carried to any control means for the power; in the illustration this being shown as the throttle lever on the carburetor 22 of the automobile.

In operation the machine is drawn on its own wheels if desirable, to the woods, where it is unhitched and turned around, the saw end elevated and the short arm of the lever 7 thrust beneath the axle, pressure on the long lever of the frame 6 readily lifts the machine and the wheels engage the drive elements on the power shaft. The work is drawn up to the saw in the manner described and the saw lowered by pressing down on the handle 16, moving the machine slightly about its point of contact with the contact wheels 5. As the saw lowers the throttle is automatically opened and the engine speeded up to drive the saw or other tool to its work. With a circular saw of suitable size, a cut may be readily made so far through a log that a blow with an ax will sever the remaining portion. Small branches or other work may be supported on a frame, not shown, beneath the tool.

In the form shown in Figure 3 the free end of the frame 6' carrying the saw 15'' and the belt pulley 13' is mounted on the front of the automobile by a suitable connection F and oscillates about the contact member 5' to the crank shaft, and the power shaft 10'. The latter carries the belt pulley 11' from which the power is transmitted to the tool by the belt 12'.

Having thus described my invention, what I claim, is,

1. A power transmission appliance for automobiles comprising a frame, a power shaft, means on the power shaft for contact with the rotating part of an automobile, wheels adjustable on the frame, a tool at one end of the frame, angular arms at the other end of the frame adapted to hook under the axle whereby as the frame is rocked on the wheels the automobile axle is lifted and slides down the angular arms to engage the contact means with the automobile wheels, and to balance the frame so that the free end with the tool may be moved to and from the work.

2. A portable transmission appliance for automobiles comprising a wheeled frame, a saw on one end of the frame, a power shaft on the other end of the frame, pulleys on the power shaft for contact with the automobile wheels, belting between the saw and the power shaft, a nigger-head on the power shaft whereby a cable attached to the work and wound on the nigger-head may be retracted to draw the work to the saw.

3. A portable power transmission appliance for automobiles comprising a power shaft, pulleys for contact with the automobile wheels, a frame pivoted to oscillate about a point adjacent the point of connection with the wheels, and carrying on its free end a saw, and a cable secured to the free end of the frame and to the throttle of the automobile engine whereby as the frame is oscillated and the saw is lowered to the work, the throttle is opened to speed the engine and vice versa.

4. A portable power transmission attachment for automobiles comprising a wheeled frame having at one end angularly upturned arms adapted to be hooked under the axle of an automobile, a drive shaft carrying friction pulleys and a belt pulley, a saw shaft at the other end of the frame carrying a saw and a belt pulley, a handle on the frame adjacent the saw whereby that end of the frame may be raised and lowered and whereby the automobile axle may be slid more or less along the angular arms to increase the pressure of the tires on the friction pulleys as the handle is depressed to bring the saw to the work and to decrease said pressure as the handle is returned and the frame assumes its normal balanced position.

5. Means for transmitting power from an automobile comprising a frame, a power shaft at one end of the frame adjacent the automobile, a work shaft at the other end of the frame, power transmitting means therebetween, angular arms adjacent the power shaft for slidingly supporting the axle of the automobile, friction pulleys on the power shaft for contact with the automobile wheels, supporting wheels on the frame adjacent the angular arms, and a handle adjacent the work shaft whereby the frame and work shaft may be rocked and the friction pulleys moved beneath or away from beneath the wheels to receive more or less of the weight of the automobile.

6. A power transmission attachment for automobiles comprising a frame having a fulcrum support upon the ground adjacent the automobile and having one end free to oscillate, a power shaft adapted to be driven by contact with a driving riding wheel of the automobile when said frame is so placed, a saw mounted on the free end of the frame, and adapted to be moved to or away from the work while the power shaft is maintained in said contact, and power transmission means between the power shaft and the saw.

7. A power transmission attachment for automobiles comprising a frame pivoted at one end and carrying drive means for connection to a rotating part thereof, means to support the attachment adjacent the automobile when said frame is so placed and in contact with said rotating part, a tool on the free end of the frame, transmission means between the tool and the drive means, a handle for oscillating the frame about its pivot to depress the tool to its work, and means comprising the weight of the automobile to counterbalance the frame and to return the tool to normal position.

In testimony whereof I affix my signature.

ROBERT HOWARD LAKE.